United States Patent
Lim et al.

(10) Patent No.: US 7,945,351 B2
(45) Date of Patent: May 17, 2011

(54) METHOD FOR CONTROLLING THE OPERATION OF A WIND TURBINE BASED ON DEVIATION BETWEEN OPERATING AND PREDETERMINED FREQUENCY RESPONSE FUNCTIONS

(75) Inventors: Khoon Peng Lim, Singapore (SG); Tie Ling Zhang, Singapore (SG); Pey Yen Siew, Singapore (SG); Srikanth Narasimalu, Singapore (SG)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 12/636,091

(22) Filed: Dec. 11, 2009

(65) Prior Publication Data

US 2010/0148507 A1 Jun. 17, 2010

Related U.S. Application Data

(60) Provisional application No. 61/122,062, filed on Dec. 12, 2008.

(30) Foreign Application Priority Data

Dec. 12, 2008 (DK) .................................. 2008 01774

(51) Int. Cl.
*H02P 9/04* (2006.01)
(52) U.S. Cl. ......................................... 700/287; 290/44
(58) Field of Classification Search .................. 700/287; 290/44, 55
See application file for complete search history.

(56) References Cited

U.S. PATENT DOCUMENTS

| 5,068,800 A | 11/1991 | Brook et al. |
| 2009/0180875 A1* | 7/2009 | Egedal et al. .................. 416/43 |
| 2009/0230681 A1* | 9/2009 | Scholte-Wassink ............ 290/44 |

FOREIGN PATENT DOCUMENTS

| EP | 1505374 A1 * | 2/2005 |
| JP | 2000019054 | 1/2000 |

OTHER PUBLICATIONS

English Abstract and Machine Translation of EP 1505374 A1.*
Steffen Hostrup Larsen; Office Action and Search Report issued in related Denmark Patent Application No. PA 2008 01774; Jun. 18, 2009; 5 pages; Denmark Patent and Trademark Office.

* cited by examiner

*Primary Examiner* — Ryan A Jarrett
(74) *Attorney, Agent, or Firm* — Wood, Herron & Evans, LLP

(57) ABSTRACT

A method for controlling the operation of a wind turbine includes determining a first measure of a mechanical input of a component of the wind turbine, and concurrently, determining a second measure of a mechanical output of the component, determining an operating frequency response function of the component from an analysis of the relation between the first measure and the second measure, comparing the operating frequency response function with a predetermined operating frequency response function and determining a possible deviation between the two, and controlling the operation of the wind turbine so as to alter the mechanical input to the component in response to the deviation. A wind turbine that implements such a method is also disclosed.

15 Claims, 3 Drawing Sheets

METHOD FOR CONTROLLING THE OPERATION OF A WIND TURBINE BASED ON DEVIATION BETWEEN OPERATING AND PREDETERMINED FREQUENCY RESPONSE FUNCTIONS

CROSS-REFERENCE TO RELATED APPLICATIONS

This application claims priority under 35 U.S.C. §119(a) to DK Application No. PA 2008 01774, filed Dec. 12, 2008. This application also claims the benefit of U.S. Provisional Application No. 61/122,062, filed Dec. 12, 2008. Each of these applications is incorporated by reference herein in its entirety.

TECHNICAL FIELD

The present invention relates to a method for controlling the operation of a wind turbine and a wind turbine.

BACKGROUND

In conventional predictive maintenance or condition based maintenance of a wind turbine component, the component operational condition is being monitored. If, in the monitoring process, a clear degradation in the component performance has been found and the deterioration has been over a given threshold, an action is triggered that the maintenance will be carried out. This usually relies on a monitoring system to detect such changes. The parameters in monitoring are usually the ones that reflect vibration, temperature, acoustic or pressure but not limited to these parameters.

SUMMARY

Embodiments in accordance with aspects of the invention provide an advantageous technique for monitoring and controlling the operation of a wind turbine component in order to increase component life time and minimize required maintenance services of the wind turbine component.

One embodiment in accordance with aspects of the invention relates to a method for controlling the operation of a wind turbine, and includes the steps of
determining a first measure of a mechanical input of a component of the wind turbine, and concurrently,
determining a second measure of a mechanical output of the component,
determining an operating frequency response function of the component from an analysis of the relation between the first measure and the second measure,
comparing the operating frequency response function with a predetermined operating frequency response function and determining a possible deviation between the two, and
controlling the operation of the wind turbine so as to alter the mechanical input to the component in response to the deviation.

The method is intended to control the operation of a wind turbine so as to prolong the operational lifespan of a wind turbine component by monitoring the condition of the component and controlling the mechanical input when the component shows signs of wear. An exemplary technique for monitoring and controlling the operation of the wind turbine component in order to increase component life time and minimize required maintenance services of the wind turbine component is hereby ensured.

The frequency response function of a mechanical component can give a good indication of the operating condition of the component. The control and operation of the wind turbine can be administered by observing any changes in the frequency response curve or function in relation to a reference frequency response curve for the mechanical component, which in turn may indicate that physical changes may have occurred.

In one aspect, altering the mechanical input to the component is done by altering the pitch of one or more wind turbine rotor blades. By altering the pitch of the rotor blades, it can be ensured that loads on various components of the wind turbine, such as pitch-bearings, main shaft, gear-box, main-bearing yaw-bearing, etc., are reduced. The reduction and control of the wind turbine in turn ensures that wear is minimized.

In another aspect, altering the mechanical input to the component is done by altering the rotational speed of the wind turbine rotor. By altering the rotational speed it can be ensured that dynamical loads on various components of the wind turbine, such as the main bearing, the gear-box, etc., are reduced. This in turn ensures that wear of the specific components is reduced. Even further, this aspect can be combined with other strategies for altering the mechanical input to the component, for example, by pitching one or more wind turbine rotor blades.

In yet another aspect, altering the mechanical input to the component results in the maximum torque at the input of the component being decreased. By reducing the maximum torque at the input of a component, e.g. the gear-box, it is ensured that the level of load and torque fluctuations of that component are also decreased. Hereby it is ensured that maximum levels of load and fluctuation are not reached and the risk of failures is decreased.

In a further aspect, altering the mechanical input to the component results in the power in one or more predefined frequency ranges being reduced. It is hereby ensured that loads that impact the component at one or more predefined frequency ranges, such as around the components natural frequency, are reduced as impacts at or around these frequency ranges often results in the highest degree of wear of the component.

In an even further aspect, determining an operating frequency response function is executed at predefined intervals. Hereby it is ensured that the control of the operation of the wind turbine can be performed at intervals, for example, initiated by a suspected degeneration of a wind turbine component that requires that another control strategy of the wind turbine, or initiated by a sudden change in the mechanical condition of the component.

In other aspects, controlling the operation of the wind turbine so as to alter the mechanical input to the component in response to the deviation is done in case the determined deviation exceeds a predetermined threshold. By not altering the mechanical input to the component before the deviation exceeds a certain threshold, it is ensured that the mechanical input is not constantly altered due to small deviations that might be determined, and certain errors in the determination of the response function, due to for example measure errors or measurements in noisy environments, can be avoided.

In another aspect, the value of the threshold can be dynamically changed during operation. By being able to change the threshold during operation, optimal control of the operation of the wind turbine can be achieved. The change of the value of the threshold can be done on the basis of, for example, load measurements, wind velocities, turbulence, etc.

In a further aspect, the frequency response function comprises at least an amplitude function. Hereby it is ensured that the determination of the deviation is based at least upon the amplitude or magnitude of the load impacts on the components and that the wind turbine can be controlled in relation hereto.

In an even further aspect, the frequency response function comprises at least a phase function. Hereby it is ensured that the determination of the deviation is based at least upon a timely relation of the load impacts on the components and that the wind turbine can be controlled in relation hereto.

In yet another aspect, the component of a wind turbine is a gearbox. By applying the above-described method to a wind turbine gearbox, it is ensured that the gear box can be operated on load levels which ensures a prolonged lifetime compared to gearboxes that are operated at substantially full load levels.

In a further aspect, the component of a wind turbine is a bearing of the wind turbine. By applying the above-described method to a wind turbine bearing, it is ensured that loads acting on the bearing can be controlled in a way that the lifetime of the bearing is increased.

In another aspect, the predetermined operating frequency function is determined substantially at the time of installation. By determining the operating frequency function at the time of the installation, it is ensured that a frequency function of the newly installed components is determined, i.e., at a time where wear and tear has not changed the mechanical characteristics of the components. Therefore, a reference frequency function is determined to which any subsequent obtained functions can be compared and any subsequent changes of the frequency function can be detected, indicating wear.

An embodiment in accordance with the invention also relates to a wind turbine prepared for performing a method according to any of the mentioned aspects.

BRIEF DESCRIPTION OF THE DRAWINGS

The invention will be described in the following with reference to the figures in which.

DETAILED DESCRIPTION

Any mechanical or electric/mechanical component or system endures a wear-out process before it fails. It is of great interest to verify when a degradation process starts and how long the remaining useful life is.

In conventional predictive maintenance or condition based maintenance, the component operational condition is being monitored. If, in the monitoring process, a clear degradation in the component performance is found and the deterioration is over a given threshold, an action is triggered to ensure that the maintenance will be carried out. This process usually relies on a separate conditioning monitoring system to detect such changes. Parameters to be monitored are usually, but not limited to, ones that reflect vibration, temperature, acoustic response or pressure.

Embodiments in accordance with aspects of the invention utilize the frequency response function of a mechanical component to give a good indication of the operating condition of the component.

The frequency response function of a mechanical component or system is a characteristic of the system that has a measured response resulting from a known applied input. This function has the purpose of identifying the natural frequencies, and damping ratios and mode shapes of the mechanical structure or component.

The natural frequency of the component is the frequency at which the component would oscillate if it were disturbed from its rest position and then allowed to vibrate freely. Many mechanical structures, such as various wind turbine components, are complex structures and may comprise multiple natural frequencies.

To measure the frequency response function of a mechanical system, it is necessary to measure the spectra of both the input force to the system and the vibration response. The frequency response function can thus be defined as the spectrum of the vibration of the component divided by the spectrum of the input force to the mechanical component or system.

The frequency response function may comprise measures of the parameters, amplitude, frequency and/or phase.

Figure 1:
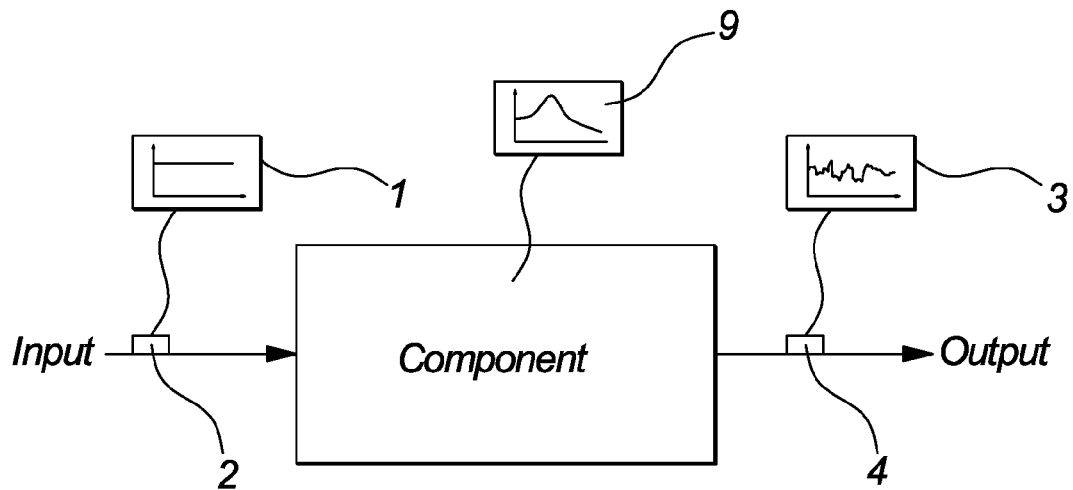
FIG. 1 schematically illustrates a typical setup for determining the frequency response of a wind turbine component.

A typical setup for determining the frequency response is schematically indicated in FIG. 1 where an "output"-spectrum of the vibration is established by, for example, output monitoring means 3 (comprising at least one sensor 4) as a response to a known applied force, for example, measured by input monitoring means 1 (comprising at least one sensor 2) at the input of the component. The transfer function of the component is indicated by 9.

In one embodiment, a signal processor may be used to receive the output spectrum of the vibration from the output monitoring means 3, to receive the known applied force measured by the input monitoring means 1, and to execute algorithms in software routines to control operation of the wind turbine based upon the data received from the output monitoring means 3 and the input monitoring means 1, as described herein.

Figure 2:
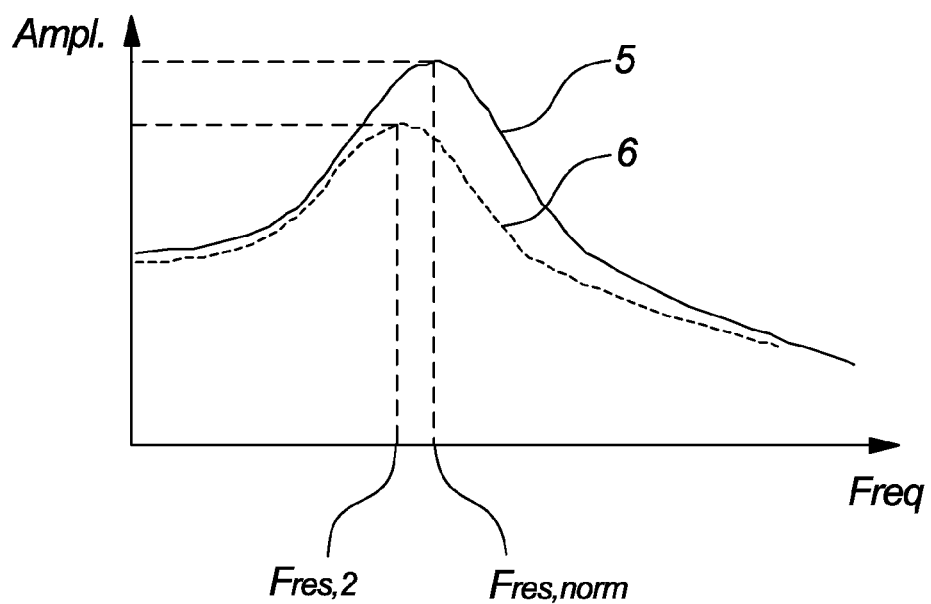
FIG. 2 schematically illustrates a fictive frequency response curve (amplitude vs. frequency) as an output spectrum of a fictive simple mechanical wind turbine component as a response to a known applied force at the input of the component.

FIG. 2 schematically illustrates a fictive frequency response curve 5 (amplitude vs. frequency) as an output spectrum of a fictive simple mechanical wind turbine component as a response to a known applied force at the input of the component.

It can be seen that the frequency response curve 5 comprises a peak at $f_{res,norm}$ which is a natural frequency of the component.

According to one embodiment of the invention, a reference frequency response curve 5 may be measured and/or determined for a wind turbine component when the component is substantially new in operation.

According to another embodiment of the invention, a reference frequency response curve 5 may be measured and/or determined after the wind turbine component has been installed for a certain time and an initial operating period has been completed.

Any changes in the frequency response curve or function in relation to a reference frequency response curve for a mechanical component may indicate that physical changes may have occurred. Changes can occur, for example, if a failure operating mode occurs or if the component is in a wear-out phase.

The curve 6 on FIG. 2 schematically illustrates such an event where the frequency response function has changed. The curve may change regarding both in relation to the values of natural frequencies, the damping ratios, and mode shapes. The change or changes on the frequency response may occur suddenly, which may indicate a sudden structural change in the component, for example, due to break down, or the change or changes may occur slowly over time, which may originate, for example, from wear and/or aging in the component.

As an explanatory example for a wind turbine component, with a reference frequency response curve 5, for example, long time wear may change the curvature to follow the curve 6, i.e., both the amplitude and frequency of the peak $f_{res,norm}$ have changed to new values at $f_{res,2}$.

As earlier described, in conventional predictive maintenance or condition based maintenance strategies for wind turbine components, the component operational condition is being monitored. If, in the monitoring process, a clear degradation in the component performance is found, for example, by the change of the frequency response curve 6 in relation to the values of natural frequencies, the damping ratio and/or mode shapes, and the deterioration is over a given threshold, an action is triggered to ensure that maintenance will be carried out.

In the time prior to reaching the threshold, the frequency response parameters can be monitored.

Figure 3:
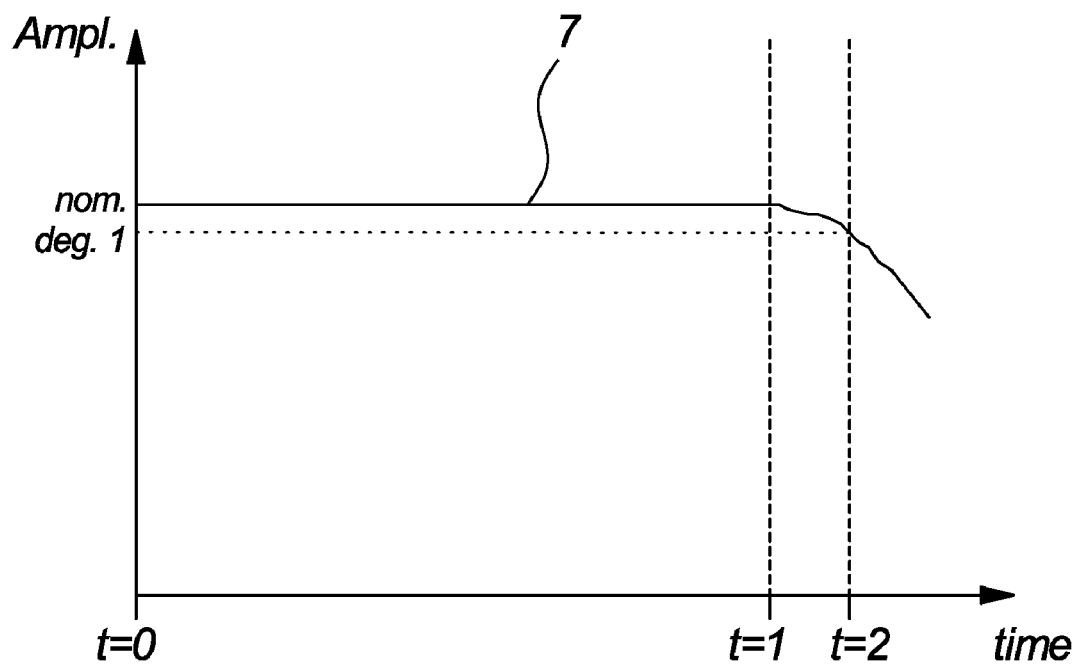
FIG. 3 schematically illustrates how one component performance parameter, e.g., the amplitude of one resonant peak of the output spectrum from a mechanical component, may vary over time due to changes in the frequency response function of the component.

FIG. 3 schematically illustrates how one component performance parameter 7, for example, the amplitude of one resonant peak of the output spectrum from a mechanical component, may vary over time due to changes in the frequency response function of the component.

From a reference time, e.g. the time of installation (t=0), the amplitude of the resonant peak is measured to be substantially constant (nom.) over time until a time where physical changes start to occur (t=1). Changes can occur, for example, if the component is in a wear-out phase.

For this illustrative example, which represents the time dependent change of the frequency response curve 5 to the changed frequency response curve 6, the remaining useful lifetime for the component may end at t=2, where the component requires scheduled maintenance and/or repair or even worse; is worn-out and likely to fail. The amplitude of the resonant peak of this example is at this point decreased to a level lower than at nominal (nom.).

For other embodiments of the invention, the component performance parameter 7 may increase in value due to wear-out.

Figure 4:
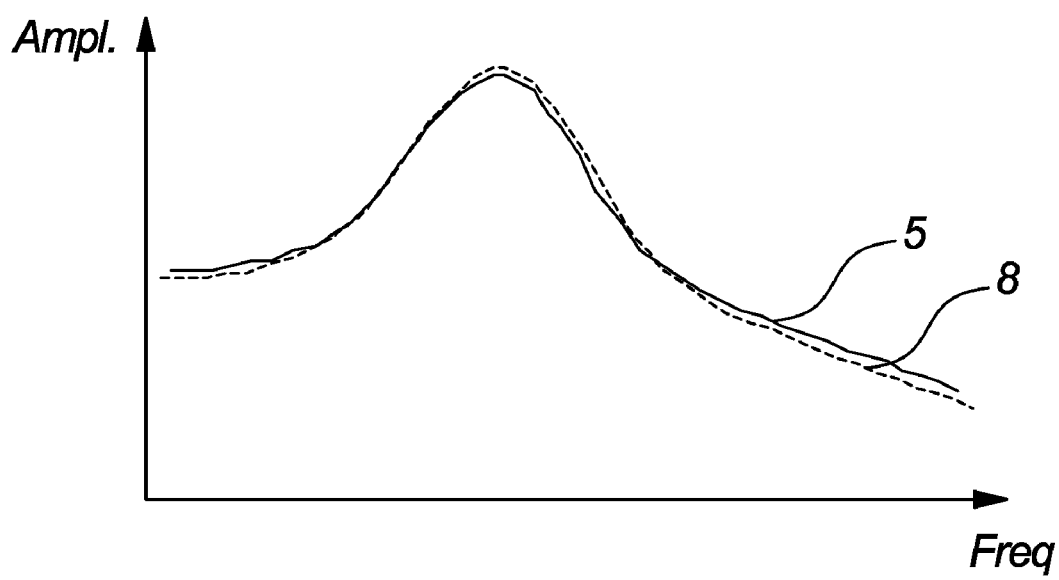
FIG. 4 schematically illustrates in one embodiment of the invention how the input of the component is controlled in a way such that the operating frequency response curve gets normalized or optimized to be substantially equal to an original reference frequency response curve.

According to various embodiments in accordance with aspects of the invention, when this change of the performance parameter 7 is monitored or the change is monitored to exceed a certain level, the input of the component is controlled in a way such that the operating frequency response curve 8 gets normalized or optimized to be substantially equal to the original reference frequency response curve 5 so as to compensate for the changes in the frequency response function of the component. This is schematically illustrated in FIG. 4 for one embodiment of the invention, where the input to the component is controlled such that the present operating frequency response curve 8 is optimized to be substantially equal to the original or reference frequency response curve 5.

Figure 5:
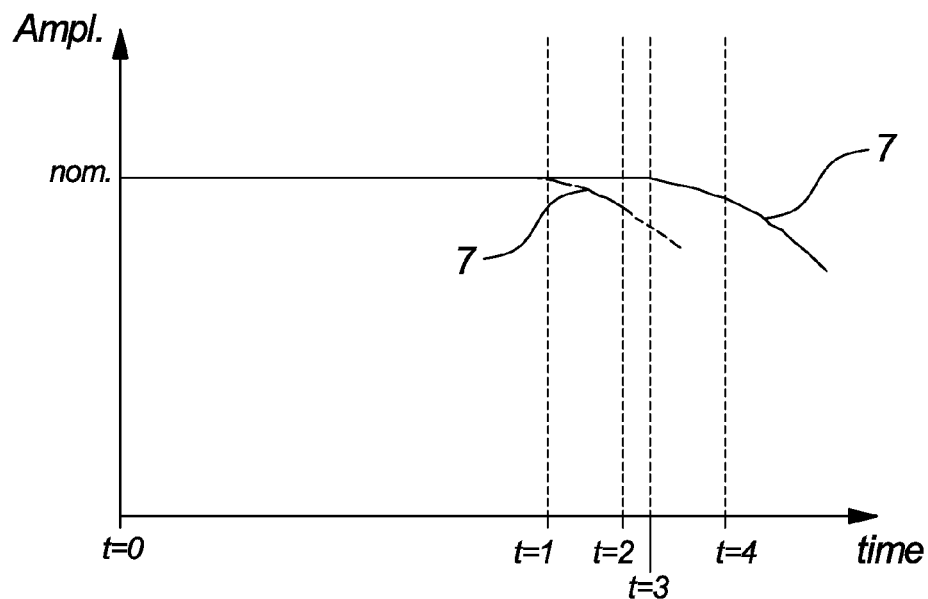
FIG. 5 schematically illustrates the impact of an optimization of the operating frequency response curve of a mechanical wind turbine component.

FIG. 5 schematically illustrates the impact of such above mentioned optimization of the operating frequency response curve 8 of a mechanical wind turbine component.

From a reference time, e.g., the time of installation (t=0), the amplitude of, for example, a resonant peak is measured to be substantially constant (nom.) over time until a time where physical changes start to occur (t=1). The remaining useful lifetime for the component may conventionally end at t=2, but according to embodiments of the invention, the input to the component is controlled such that the component output spectrum gets normalized or optimized to the reference level (nom.).

By this continuous adaption of the input to the component, the remaining useful lifetime is prolonged, i.e., the amplitude of the component performance parameter will not start to decrease from nom. level before time t=3 and the expected remaining useful lifetime for the component may end, for example, at t=4.

A consequence of an implementation of aspects of the invention is that the lifetime of the wind turbine components is prolonged and the wind turbine can be operated for longer periods without need for, for example, closing down the turbine for service, i.e., the time between service is prolonged. Hereby it is feasible to produce more power.

Figure 6A:
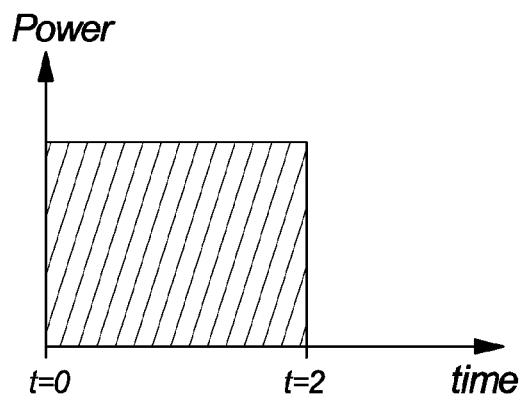
FIG. 6a schematically illustrates the level of power production from installation time to where the lifetime for the wind turbine component conventionally ends.
Figure 6B:
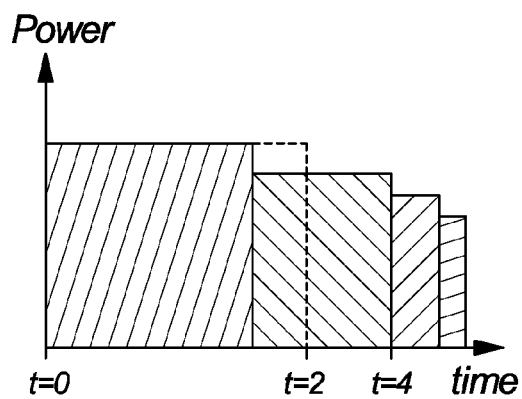
FIG. 6b illustrates the level of power production for a wind turbine according to various embodiments of the invention.

This is schematically illustrated for various embodiments of the invention in FIGS. 6a and 6b.

FIG. 6a illustrates the level of power production from installation time (t=0) to the time t=2 where the lifetime for the wind turbine component conventionally ends and the wind turbine must be closed down for maintenance or repair. The power produced may be regarded as the hatched area on the figure.

FIG. 6b illustrates the level of power production for a wind turbine according to various embodiments in accordance with aspects of the invention.

From installation time (t=0) the wind turbine is controlled according to the above-described technique which often has the result that the input force to the wind turbine component is reduced, for example, at a time before t=2, i.e., at a time before where the lifetime for the wind turbine component conventionally ends. Hereby the component output spectrum gets normalized or optimized to a reference level. By reducing the input force to the wind turbine, the produced power may also be reduced at a time before t=2 as indicated on the figure. Hereby the wind turbine can be operated further, such as to the time t=4, where a similar normalization/optimization is performed, for example, by reducing produced power and the wind turbine can be operated even further. It can be seen that the power produced over time, i.e., the hatched area, is increased and that the normalization/optimization process may be iterative, i.e., repeated a plurality of times at certain time intervals.

Hereby the wind turbine component and the wind turbine as such can be operated over a longer period of time without requiring maintenance or service; in other words, the time between services is increased.

This can be exploited in a way that the wind turbine does not need to be interrupted, for example, during the high wind season, but still can be operated to produce power even though this might be at a level lower than rated. This in turn means that maintenance is postponed to the low wind season.

What is claimed is:

1. A method for controlling the operation of a wind turbine, comprising:

determining a first measure of a mechanical input of a component of the wind turbine, and concurrently, determining a second measure of a mechanical output of the component, determining an operating frequency response function of the component from an analysis of the relation between the first measure and the second measure, comparing the operating frequency response function with a predetermined operating frequency response function and determining a possible deviation between the two, and controlling the operation of the wind turbine so as to alter the mechanical input to the component in response to the deviation.

2. The method according to claim 1, wherein altering the mechanical input to the component is done by altering a pitch of one or more wind turbine rotor blades.

3. The method according to claim 1, wherein altering the mechanical input to the component is done by altering a rotational speed of a wind turbine rotor.

4. A method according to claim 1, wherein altering the mechanical input to the component is carried out such that a maximum torque at the input of the component is decreased.

5. The method according to claim 1, wherein altering the mechanical input to the component is carried out such that a power in one or more predefined frequency ranges is reduced.

6. The method according to claim 1, wherein determining an operating frequency response function is executed at predefined intervals.

7. The method according to claim 1, wherein controlling the operation of the wind turbine so as to alter the mechanical input to the component in response to the deviation is done in case the determined deviation exceeds a predetermined threshold.

8. The method according to claim 7, wherein a value of the threshold can be dynamically changed during operation.

9. The method according to claim 1, wherein the operating and predetermined frequency response functions comprise at least an amplitude function.

10. The method according to claim 1, wherein the operating and predetermined frequency response functions comprise at least a phase function.

11. The method according to claim 1, wherein the component of the wind turbine is a gearbox.

12. The method according to claim 1, wherein the component of the wind turbine is a bearing of the wind turbine.

13. The method according to claim 1, wherein the predetermined operating frequency function is determined substantially at the time of installation of the wind turbine.

14. A wind turbine prepared for performing a method according to claim 1.

15. The wind turbine according to claim 14, wherein the component of the wind turbine is a gearbox.

* * * * *

UNITED STATES PATENT AND TRADEMARK OFFICE
CERTIFICATE OF CORRECTION

| | | |
|---|---|---|
| PATENT NO. | : 7,945,351 B2 | Page 1 of 1 |
| APPLICATION NO. | : 12/636091 | |
| DATED | : May 17, 2011 | |
| INVENTOR(S) | : Khoon P. Lim et al. | |

It is certified that error appears in the above-identified patent and that said Letters Patent is hereby corrected as shown below:

In the Specification:

At column 2, line number 40, change "results" to --result-- and at line number 47, after "requires", delete "that".

At column 3, line number 13, change "ensures" to --ensure-- and at line number 27, change "subsequent" to --subsequently--.

Signed and Sealed this
Twenty-sixth Day of July, 2011

David J. Kappos
*Director of the United States Patent and Trademark Office*